United States Patent [19]

Chute et al.

[11] 4,342,624
[45] Aug. 3, 1982

[54] VAPOR COMPRESSION LIQUID TREATING SYSTEM

[75] Inventors: Richard Chute, Birmingham; Ralph P. Horan, Troy, both of Mich.

[73] Assignee: Eaton Corporation, Cleveland, Ohio

[21] Appl. No.: 290,763

[22] Filed: Aug. 7, 1981

Related U.S. Application Data

[60] Division of Ser. No. 14,005, Feb. 21, 1979, abandoned, which is a continuation of Ser. No. 851,651, Nov. 15, 1977, abandoned, which is a continuation-in-part of Ser. No. 673,567, Apr. 5, 1976, abandoned.

[51] Int. Cl.³ .......................... B01D 1/28; B01D 3/42
[52] U.S. Cl. .................................... 202/176; 202/205; 202/237; 134/12; 159/24 A; 159/27 R; 203/1; 203/3; 203/11; 203/26; 203/98
[58] Field of Search ............... 202/187, 180, 177, 176, 202/160, 159, 205, 168, 206, 169, 237, 238; 203/1, 3, 11, 26, 24, 98, 50, 96; 159/2 R, 47 R, 24 A, 24 R, 27 R; 134/12

[56] References Cited

U.S. PATENT DOCUMENTS

| | | | |
|---|---|---|---|
| 2,446,880 | 8/1948 | Kleinschmidt | 203/26 |
| 2,449,587 | 9/1948 | Chambers | 202/237 |
| 2,762,761 | 9/1956 | Stanley et al. | 202/206 |
| 3,136,707 | 6/1964 | Hickman | 202/236 |
| 3,175,962 | 3/1965 | Holtslag | 203/11 |
| 3,192,130 | 6/1965 | Pottharst | 203/26 |
| 3,494,835 | 2/1970 | Mahistre | 203/26 |
| 3,558,438 | 1/1971 | Schoenbeck | 203/26 |
| 3,575,007 | 4/1971 | Gunther | 203/26 |
| 3,575,814 | 4/1971 | Bahrenburg | 203/26 |
| 3,957,588 | 5/1976 | Humiston | 203/24 |

Primary Examiner—Wilbur L. Bascomb, Jr.
Attorney, Agent, or Firm—C. H. Grace; J. G. Lewis

[57] ABSTRACT

A liquid containing a solvent to be evaporated is fed to a concentration chamber which is fluidly connected to an evaporation chamber maintained at a reduced pressure. A vapor compression means withdraws solvent vapor from the evaporation chamber, compresses the vapor and forces the compressed vapor to a liquification chamber. Regulator means responsive to the density of the liquid remaining within the concentration chamber will regulate the rate of solvent evaporation to provide a concentrate suitable for recycling.

A method of operating the still of this invention utilizes the technique of increasing the compressor capacity until the compressor begins to surge and then reducing the capacity a fixed amount to provide the desired efficiency.

4 Claims, 2 Drawing Figures

VAPOR COMPRESSION LIQUID TREATING SYSTEM

CROSS REFERENCES TO RELATED APPLICATIONS

This application is a division of Ser. No. 14,005 filed Feb. 21, 1979 now abandoned which was a continuation of Ser. No. 851,651 filed Nov. 15, 1977 now abandoned, which was a continuation-in-part of Ser. No. 673,567 filed Apr. 5, 1976 now abandoned.

BACKGROUND OF THE INVENTION

1. Field of the Invention

In one aspect, this invention relates to vacuum distillation systems. In another aspect, this invention relates to closed loop waste treating systems. In yet a further aspect, this invention relates to methods of using distillation systems.

2. Description of the Prior Art

Prior art distillation systems wherein a variable speed compressor is used to put energy into a vapor which is in turn condensed to give off latent heat of vaporization to a distilland are known in the art. One example of such a system is shown by U.S. Pat. No. 2,446,880. These systems have been primarily used for water desalinization and operate at temperatures near or even above the boiling point of water at atmospheric pressure.

Such systems are not desirable for distilling fruit juices or plating solutions; since they must be concentrated at temperatures well below the boiling point of water to prevent degradation of the organic materials present.

SUMMARY OF THE INVENTION

It is an object of this invention to provide an improved method of controlling the vapor compression process. The vapor compression system of this invention has an evaporation chamber maintained at a reduced pressure, a concentration chamber for holding the distilland to be concentrated, a density measuring means for measuring distilland density, and an evaporation surface connecting to the concentration and evaporation chambers. This configuration allows the distilland to be retained within the concentration chamber until the desired distilland concentration measured as a function of density is obtained.

As a further feature of this invention, the compressor capacity is increased until the compressor reaches a surge condition and the compressor capacity is reduced an incremental amount to bring the compressor into the desired operating range.

DETAILED DESCRIPTION OF THE PREFERRED EMBODIMENTS

Figure 1:
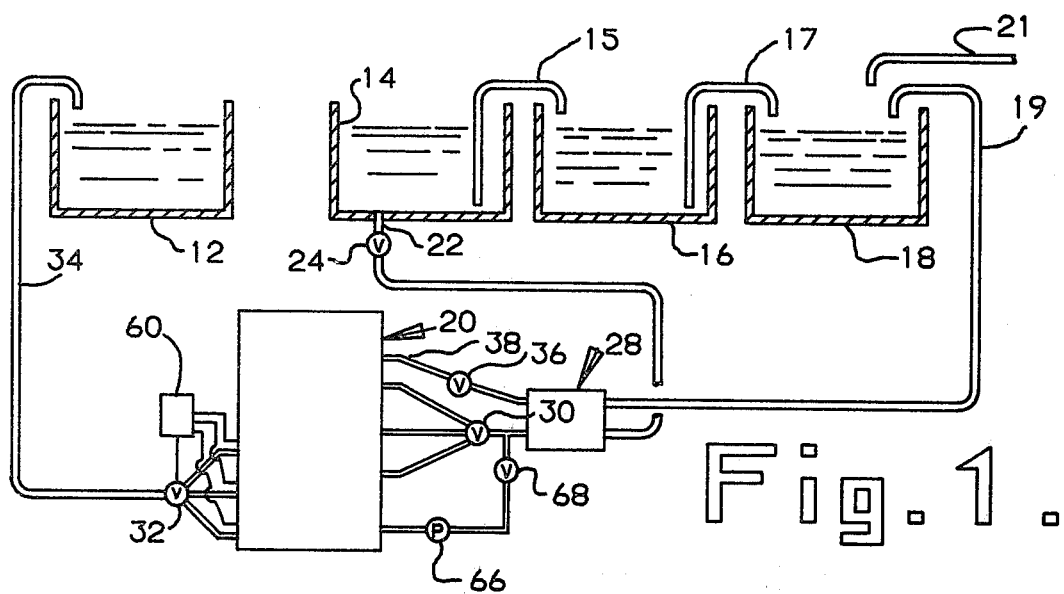
FIG. 1 is a schematic drawing of a plating line which includes a vapor compression unit of this invention and is adapted for closed loop operation.

A typical plating schematic using a vapor compression still is shown in FIG. 1. Parts to be plated are placed in a plating tank 12 which contains a solution of ions to be deposited on the parts as a metal layer. After a metal layer has been deposited on the parts, the plated parts are moved successively to rinse tanks 14, 16, 18 where any plating solution clinging to the plated part is rinsed off.

A substantial amount of plating solution, containing valuable metal ions and organic additives, is carried into the rinse tanks. Also, some water is carried from tank to tank by the parts as they are rinsed. The carry over and evaporation from the rinse tanks depletes the water in the rinse tanks and the concentration of plating solution will steadily rise, especially in the first rinse tank 14.

A portion of the water in the first rinse tank 14 is periodically withdrawn from the bottom of the tank and sufficient water from the second tank 16 is transferred via line 15 to refill tank 14. The tank 16 is refilled from tank 18 via line 17 and tank 18 is in turn filled by purified water from a vapor compression still 20 via line 19. Additional water can be added from an outside source of fresh water 21 when needed.

As shown, the rinse water or distilland from the first rinse tank 14, is withdrawn at outlet 22 by opening valve 24. The contaminated rinse water is conveyed by a pipe 26 to a heat exchanger 28 where the rinse water extracts some heat from purified water condensed in the vapor compression still 20. The preheated rinse water passes through a three-way valve 30 and is fed to the vapor compression still from the rinse water. The rinse water is concentrated to a density suitable for return to the plating tank 12. The concentrated solution is withdrawn from the concentration chamber through a valve 32 and pumped to the plating tank 12 via a line 34.

The pure water resulting from the vapor compression cycle is withdrawn through valve 36 into the heat exchanger 28 via line 38 and then is returned to rinse tank 18 by line 19.

If desired, the vapor compression system can be used to purify water before it enters the plating cycle. Treatment of the water before it enters the system removes the calcium, magnesium, and other undesired metal ions which are present in every source of water. These metal ions will concentrate in the plating bath as water is lost and settle out as solid salts to form a sludge at the bottom of the tank 12 or remain in the plating solution. In either case, the increasing concentration of undesired metal ions reduces plating efficiency. Eventually the plating solution must be discarded, resulting in a loss of valuable metal ions in the solution discarded, or the sludge must be removed from the plating tank requiring that plating operations be suspended. Accumulation of this sludge would be particularly pronounced where the process cycle is a closed loop as shown. Purification of the incoming fresh water would lessen or eliminate this problem.

Figure 2:
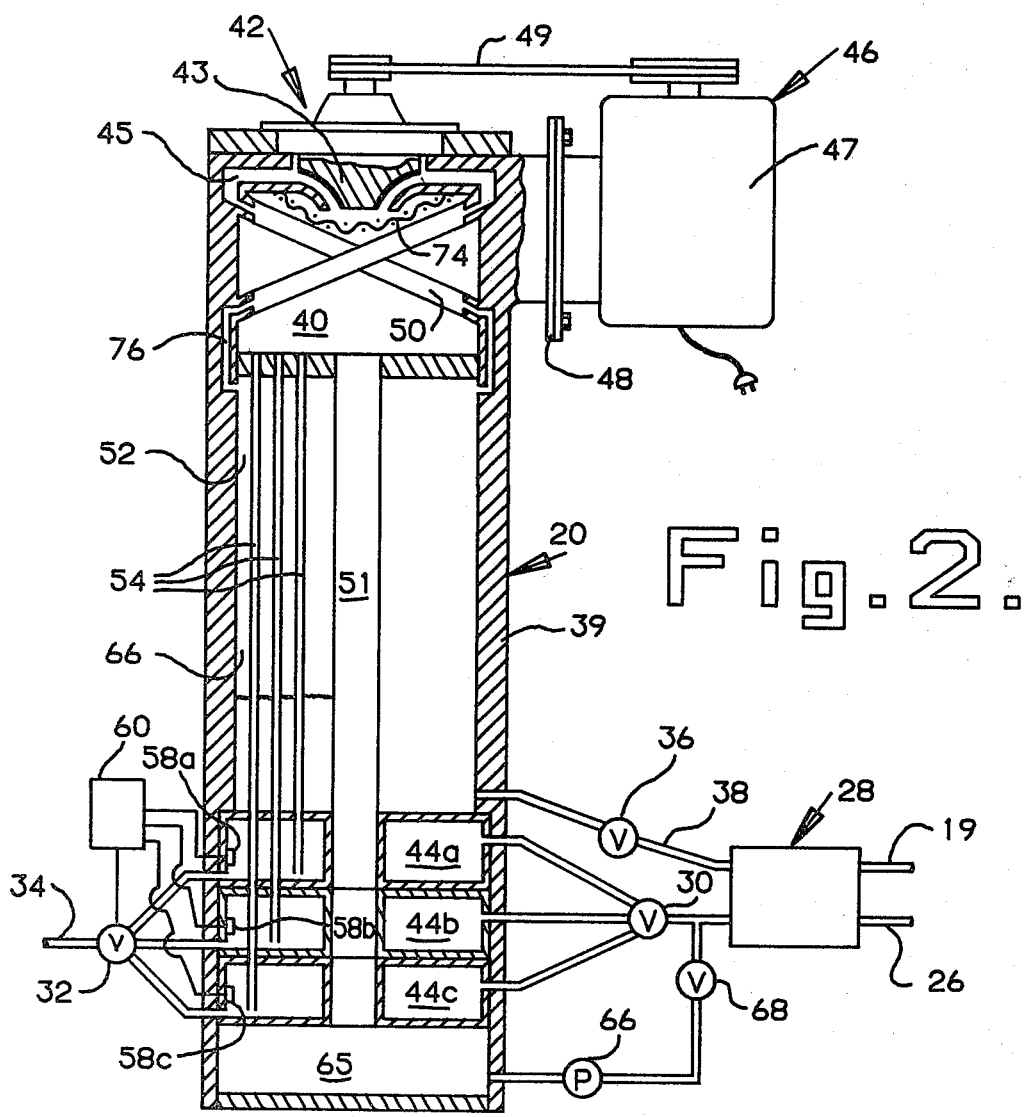
FIG. 2 is a side elevation view in partial section of a vapor compression unit incorporating features of this invention.

FIG. 2 shows a detailed view of one vapor compression apparatus useful in the practice of this invention. The operation of this unit is described with reference to plating rinse water. The system could also be used to treat other liquids such as fruit juices, organic solvents or sea water. A generally cylindrical, vertically oriented housing 39 defines an evaporation chamber 40 which collects vaporized water from the inside of the tubes 54 located at one end of the housing near a compressor 42. The compressor 42 comprises generally a compressor wheel 43, volute 45 and driving means 46. As shown, the driving means is an electric motor 47 mounted on a bracket 48 attached to the housing 39. The motor 47 drives a V-belt drive 49 which in turn rotates the compressor wheel 43. The compressor wheel 43 withdraws vapor from the evaporation chamber maintaining the evaporation chamber at a reduced pressure e.g., 0.5 to 1.5 pisa. As shown, cross-tubes 50 transport compressed vapor from the volute 45 to a condensation-heat exchanger chamber 52.

At the lower end of the housing 39, distal the compressor 42, are a number of concentration chambers (three being shown) 44a, 44b, 44c which are filled with rinse water to be concentrated or incoming fresh water to be purified. Each concentration chamber is fluidly connected to the evaporation chamber 40 by an evaporation surface. As shown, the fluid connection is by means of capillary tubes 54 which extend from the lower portion of their respective concentration chambers and terminate in the plate 56 which forms the floor of the evaporation chamber 40. In general there will be a plurality of tubes extending from each concentration chamber into the evaporation chamber, only one tube per concentration chamber being shown for clarity. The interior walls of the capillary tubes 54 are wet by the liquid being concentrated and provide a large surface area for the formation of water vapor which passes into the evaporation chamber 40.

Sensing means 58a, 58b, and 58c are installed in each concentration chamber to measure the concentration of the remaining liquid. As shown, the various sensing means generate an electrical signal which is fed to a control means 60. The control means 60 activates the three-way valve 32 so that the concentration chambers can be emptied when the liquid in the chambers reaches the desired concentration. In one aspect of this invention the concentration of the remaining liquid is determined by measuring its density. Suitable density measuring devices are known in the liquid measuring art. One general method of density measurement, which could be used in practicing this invention, is displacement measurement using a float. Such devices operate by submerging a float in the liquid to be measured. The float's movement up and down within the liquid generates a continuously variable signal proportional to the density of the surrounding liquid. A full description can be found in *Chemical Engineers Handbook*, 5th Ed., McGraw-Hill, New York, 1973, especially pages 22–48, and 49, the disclosure of which is incorporated herein by reference.

In general, pumps (not shown) would be associated with the various valves to move the liquid within the system as needed. The chamber would be replenished via valve 30 with more liquid to be concentrated as needed.

A large diameter vertically oriented duct 51 extends longitudinally along the middle of housing 39. Overflow liquid from tubes 54 flows into the duct and down into a reservoir 65.

The liquid in reservoir 65 can in turn be pumped by a pump 66 through a valve 68 to the inlet of valve 30, returning the overflow liquid into the concentration chamber.

OPERATION

In general, as with stills of this type, vapor from the liquid being treated will be generated on an evaporation surface. The vapor generated will be drawn into a compressor, compressed, and the compressed vapor is condensed. Generally the vapor is condensed so that the latent heat of condensation is transferred to the liquid being treated thereby creating more vapor to be compressed.

In greater detail, vapor exiting from the upper end of tubes 54 will enter the evaporation chamber 40, passing over the cross tubes 50. As the vapor passes the cross tubes 50, it will remove some heat from the cross tubes which super heats the vapor and lowers the heat in the compressed vapor. The rising vapor enters a liquid carrier 74 which will remove any remaining liquid droplets entrained in the vapor stream. The barrier is shown as a screen but can be other materials known in the art, one barrier material being porous agglomerated plate.

The vapor, free from liquid, enters the housing surrounding the rotating compressor wheel 43, is accelerated by the wheel and is pushed into the volute 45 where the vapor's velocity decreases and the pressure increases.

The vapor from volute 45 enters the cross tubes 50 and passes through the tubes to a plenum 76 located within the housing. From the plenum, the compressed vapor enters a variable capacity heat exchange chamber. The heat exchange chamber comprises the chamber 52 defined by the plate 56, the upper surface of concentration chamber 44a, and the housing 39. Vapor entering the chamber 52 will be exposed to the exterior walls of the tubes 54 and, being at a higher temperature and pressure than the liquid inside the tubes, will condense to form a liquid. As shown, the chamber 52 contains a quantity of liquid and a vapor filled space 66 above the liquid. The heat transfer to the capillary tubes is different for the vapor filled phase and the liquid phase. By varying the liquid level within the heat exchange chamber 52, the amount of heat transferred to the liquid within the tubes 36 and thus the amount of additional vapor created can be controlled. The heat transfer and thereby the amount of vapor can also be controlled by varying the height of solvent within the tubes, a lower liquid level resulting in a lower heat transfer.

Of course, control of the vapor compression still involves several variables in addition to the liquid level in the chamber 52 or tubes 54. With a given compressor wheel, the amount of liquid withdrawn from the concentration chambers will vary as a function of: compressor wheel speed, inlet geometry and guide vane angle. In general, if the liquid level in the heat exchange chamber is increased, the amount of heat available to evaporate solvent and concentrate liquid is decreased.

The inlet geometry can be changed to vary the compressor's operating capacity. Such variable inlet geometries are well known in the art and a further description is omitted in the interest of brevity.

Because of changes in the distilland or variations in the production process to which this system is attached changes are necessary from time to time. One method of operating the compressor of this system is to increase the compressor capacity, such as by increasing compressor wheel speed until the compressor crosses the surge line and begins to surge. The compressor capacity could then be reduced by a fixed amount, such as by changing compressor speed or inlet geometry, to bring the capacity to the desired point on the efficiency curve. The operating efficiency curves are determined by the variables present in the system each system being individualistic but the operating characteristic curve as easily calculated or emperically determined. Such charts showing efficiency islands as a function of pressure ratio versus flow at a constant impeller tip speed are so well known that a detailed example is omitted. One example of a centrifugal compressor performance chart can be found in *Gas Turbines,* Sorenson, Ronald Press Co., New York, 1951, especially page 267.

Ordinarily causing a centrifugal compressor wheel to surge would not be a viable means of controlling a process. However, because the compressor wheel is operating at a reduced pressure, the amount of energy applied to the wheel during surge is minimal. Using the surge point of the compressor as a control measurement provides a quick and easy method of determining the operating conditions at a given time since the pressure ratio changes markedly when the compressor surges. Pressure sensing devices are well known in the art and a detailed description is omitted in the interest of brevity. The surge control can be used in combination with the variable heat exchanger to further increase the efficient operating range of the system.

The operating steps detailed above could be performed by a microprocessor which would receive relevant data and determine the operating condition of the system by comparison with a predetermined performance chart. If the system needed correction, the microprocessor would be programmed to drive the system into the surge condition and adjust the compressor capacity as discussed hereinbefore.

Where the liquid in one of the concentration chambers 44a, 44b, and 44c reaches the desired concentration, the sensing means in the associated chamber will activate the control means 60 which in turn activates the valve 32 to empty the concentration chambers. The emptied chamber is refilled and the process continues.

Various modifications and alterations of this invention will become obvious to those skilled in the art without departing from the scope and spirit of this invention. For example, the still of this invention can be used to concentrate fruit juice and for disalinization of water in addition to treating plating rinse water.

What is claimed is:

1. A vapor compression still for concentrating a contaminated solvent to form a concentrate suitable for recycling and a purified solvent comprising:

a. a housing enclosing an evaporation chamber;
   b. a dynamic compressor disposed adjacent one end of the housing for evacuating the evaporation chamber and compressing vapor withdrawn by said compressor;
   c. a plurality of concentration chambers substantially coaxially disposed at the end of the housing distal the compressor, each adapted to hold solvent to be concentrated;
   d. a plurality of capillary tubes wetable by the contaminated solvent, each of said tubes having one end disposed within the solvent being concentrated within one of said concentration chambers and the other end disposed within the evacuated evaporation chamber;
   e. means for directing the contaminated solvent in parallel flow to each of said concentration chambers for concentration;
   f. means associated with each of said concentration chambers to selectively withdraw the concentrate;
   g. means for sensing the density of the concentrate withdrawn from each of said concentration chambers; and
   h. means for varying the rate at which vapor is removed from the contaminated solvent in the evaporation chamber as a function of variations in the density of concentrate withdrawn from the concentration chambers.

2. The still of claim 1, wherein said dynamic compressor comprises a centrifugal compressor driven by a variable speed drive means.

3. The still of claim 1, having cross-tube members which extend across the evaporation chamber at a location near an inlet for said compressor, said tubes transporting compressed vapor from the compressor and giving off heat from the compressed vapor to vapor in the evacuation chamber.

4. The still of claim 1, further comprising means for mixing a portion of condensed, purified liquid solvent with incoming contaminated solvent to modify the volume of contaminated solvent to be concentrated to maintain the compressor at maximum operating efficiency.

* * * * *